United States Patent
Oshima et al.

Patent Number: 5,723,200
Date of Patent: Mar. 3, 1998

[54] DECORATIVE SHEET

[75] Inventors: Masahiro Oshima; Katumi Shimizu; Taturo Otani, all of Osaka, Japan

[73] Assignee: Meiwa Gravure Co., Ltd., Osaka, Japan

[21] Appl. No.: 683,389

[22] Filed: Jul. 18, 1996

[30] Foreign Application Priority Data

Feb. 6, 1996 [JP] Japan ................... 8-019619

[51] Int. Cl.$^6$ .................. B32B 3/00; A47G 35/00
[52] U.S. Cl. .................. 428/172; 428/167; 428/195; 428/542.2
[58] Field of Search .................. 428/542.2, 167, 428/161, 172, 141, 143, 195, 206; 359/321, 536

[56] References Cited

U.S. PATENT DOCUMENTS

| | | | |
|---|---|---|---|
| 2,951,419 | 9/1960 | Lemelson | 428/167 |
| 4,127,693 | 11/1978 | Lemelson | 428/163 |
| 5,254,390 | 10/1993 | Lu | 428/150 |

*Primary Examiner*—Donald Loney
*Attorney, Agent, or Firm*—Kubovcik & Kubovcik

[57] ABSTRACT

In a decorative sheet formed by a transparent sheet body having front and rear surfaces, a plurality of convex lens-shaped projections are provided on the front surface in an arbitrary continuous pattern, while figures are printed on the rear surface in the same pattern as that on the front surface, in displacement from the continuous pattern of the front surface, whereby a sheet of excellent decorativeness of which pattern is changeable with the direction of observation is provided in a simple structure at a low cost.

5 Claims, 3 Drawing Sheets

DECORATIVE SHEET

BACKGROUND OF THE INVENTION

1. Field of the Invention

The present invention relates to a decorative sheet which has such decorativeness that its pattern is changeable with the angle of observation, to be preferably applied to a tablecloth or a bathroom curtain.

2. Description of the Background Art

In a conventional decorative sheet of this type having a pattern which is changeable with the angle of observation, a plurality of substantially semicircular projections are provided on a front surface of a transparent synthetic resin sheet in a continuous pattern at a specific pitch, while similar substantially semicircular projections are formed on a rear surface of the sheet at a pitch which is slightly different from that of the continuous pattern provided on the front surface thereby expressing a light interference pattern to change the pattern with the angle of observation, as described in Japanese Patent Publication No. 42-25797 (1967).

However, this type of decorative sheet has continuous projections on both surfaces, and hence it is difficult to obtain a sheet which is richer in decorativeness by sticking a laminate sheet having a printed layer on a single side of the sheet, for example. Further, the substantially semicircular projections must be simultaneously provided on both surfaces of the sheet with precise emboss rolls or the like, and this leads to inferior productivity and a high cost. Thus, the conventional decorative sheet cannot be industrially provided at a low cost.

SUMMARY OF THE INVENTION

Accordingly, an object of the present invention is to provide a highly decorative sheet having a pattern which is changeable with the direction of observation in a simple structure at a lower cost.

In order to attain the aforementioned object of the present invention, a plurality of convex lens-shaped projections are provided on a front surface of a transparent sheet body in an arbitrary continuous pattern, while figures are printed on a rear surface of the transparent sheet in the same continuous pattern as that on the front surface, in displacement from the continuous pattern on the front surface.

Due to this structure, the pattern of the figures which are formed on the rear surface is displaced from that of the convex lens-shaped projections which are formed on the front surface in the transparent sheet body, whereby the figures provided on the rear surface overlap with the convex lens-shaped projections provided on the front surface at degrees different from each other. In projection parts where the figures and the projections completely overlap with each other, the figures are visible from every direction. In other projection parts where the figures are displaced from the projections by a distance substantially corresponding to the radius of the projections, however, the figures are visible from a certain direction, but invisible from another direction. Thus, the figures are visible or invisible depending on the direction of observation.

Further, the figures are formed by those which are visible and invisible from a single direction due to the difference between the degrees of overlapping with the projections, whereby the overall sheet attains excellent decorativeness with a changeable pattern.

According to the present invention, a transparent laminate sheet body may be further stuck on the rear surface of the transparent sheet body, so that a printed layer is provided on a non-stuck surface of the laminate sheet body.

In this case, the figures are visible from any direction in the projection parts where the same completely overlap with the projections as described above. However, the printed layer which is provided on the laminate sheet body overlaps with the figures in positions which vary with the direction of observation due to the thickness of the laminate sheet, whereby the figures appear to move on the printed layer as the direction of observation is continuously changed. Namely, the overall sheet can be recognized as if the figures changeably move on the printed layer, whereby further decorativeness can be attained.

According to the present invention, further, a transparent laminate sheet body may be further stuck on the rear surface of the transparent sheet body so that further figures are printed on a non-stuck surface of the laminate sheet body in the same continuous pattern as that on the front surface of the transparent sheet body, in displacement from the continuous patterns on the front and rear surfaces of the transparent sheet body.

In this case, the figures which are stacked with and displaced from each other are further displaced from the pattern of the convex lens-shaped projections, whereby the figures appear changeful in states which are different from each other, whereby decorativeness having a stereoscopic effect can be attained.

According to the present invention, further, a transparent laminate sheet body may be further stuck on the rear surface of the transparent sheet body so that an irregular pattern is provided on a non-stuck surface of the laminate sheet.

In this case, a moire pattern which is defined by the projections and the irregular pattern is different in image formation position from the pattern which is defined by the projections and the figures, whereby the moire pattern and the pattern defined by the figures can form images on different planes when the angle of observation is changed. Thus, decorativeness having a stereoscopic effect can be attained.

From another viewpoint, the invention may be constructed such that a plurality of convex lens-shaped projections is provided on a front surface of a transparent sheet body in an arbitrary continuous pattern; a printed layer is provided on a rear surface of the transparent sheet body; a transparent laminate sheet body is further stuck on the rear surface of the transparent sheet body; and figures are printed on a non-stuck surface of the laminate sheet body in the same continuous pattern as that on the front surface, in displacement from the continuous pattern formed on the front surface of the transparent sheet body.

In this construction, the figures appear as shades of the transparent printed layer due to the interposition of the printed layer between the projections and the figures while the same appear to move due to the projections provided on the front surface. Thus, decorativeness which is full of a stereoscopic effect can be attained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
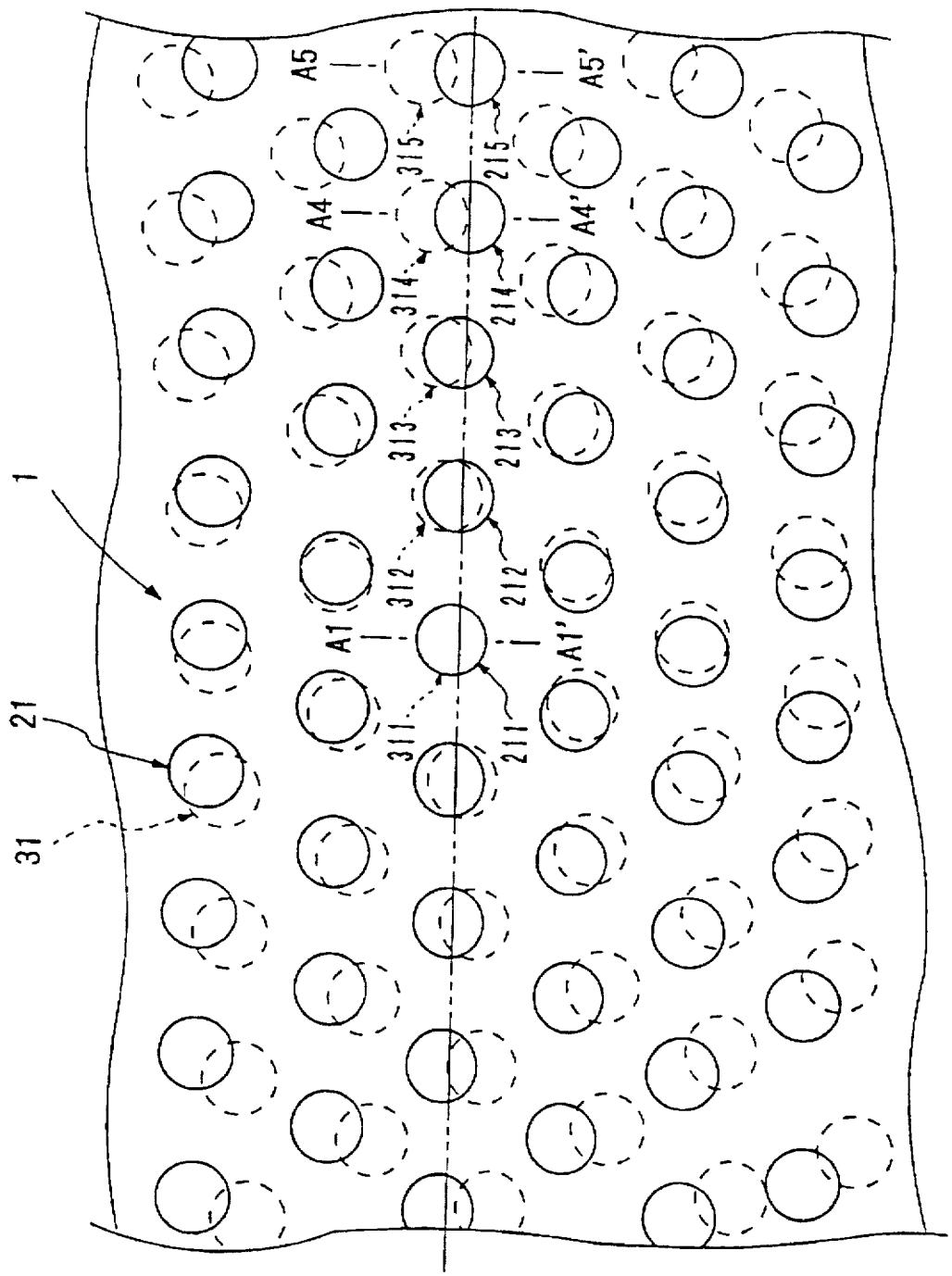
FIG. 1 is an enlarged plan view showing a decorative sheet according to a first embodiment of the present invention.

FIG. 1 shows a first embodiment of the present invention. This figure is an enlarged plan view showing a decorative sheet comprising a transparent sheet body 1 having a front surface 2 which is provided with a plurality of convex lens-shaped projections 21 along an arbitrary continuous pattern axis (two-dot chain line in FIG. 1) in a hexagonal pattern and a rear surface 3 which is provided with dot figures 31 printed thereon along a continuous pattern axis which is identical to but displaced from that of the front surface 2. The convex lens-shaped projections 21 include semispherical projections, while the figures 31 may be replaced with polygonal figures corresponding to the projections 21. While the projections 21 and the figures 31 are arranged in hexagonal patterns, the same may alternatively be arranged in polygonal patterns such as triangular or square patterns.

According to FIG. 1, the projections 21 separate from the figures 31 as the same separate from the position where the figure 31 and the projection 21 completely overlap with each other.

Figure 2:
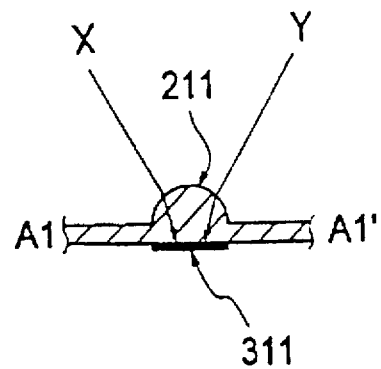
FIG. 2 is a partial sectional view taken along line A1–A1' in FIG. 1 showing the decorative sheet according to the first embodiment of the present invention.
Figure 3:
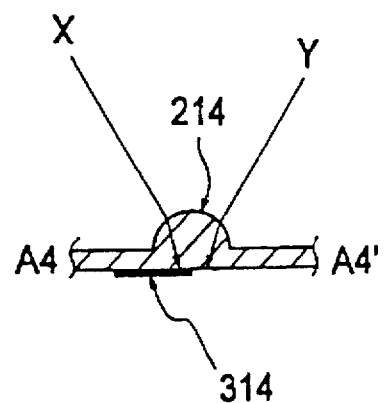
FIG. 3 is a partial sectional view taken along line A4–A4' in FIG. 1 showing the decorative sheet according to the first embodiment of the present invention.
Figure 4:
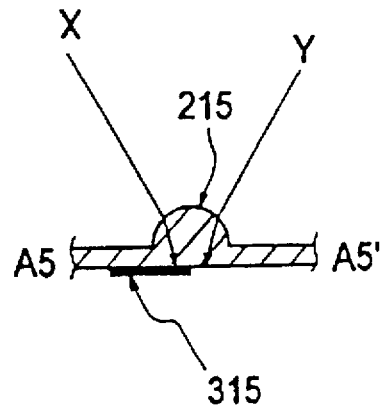
FIG. 4 is a partial sectional view taken along line A5–A5' in FIG. 1 showing the decorative sheet according to the first embodiment of the present invention.

As shown in FIG. 2, the figure 31 is visible from any direction in a projection part 211 where the figure part 311 and the projection 21 completely overlap with each other. In another projection part 214 where the figure part 314 is displaced from the projection 21 by a distance substantially corresponding to the radius of the projection 21, the figure part 314 is invisible from a direction Y although the same is visible from a direction X, as shown in FIG. 3. Thus, the figure part 314 is visible or invisible depending on the direction of observation in the projection part 214. In still another projection part 215 further separating from the projection part 211, the figure part 315 is invisible from the direction Y while the same is not completely visible from the direction X. Thus, the projection part 215 appears in a pale color due to a color mixture effect. Therefore, the overall decorative sheet has a pattern which is changeable with the angle of observation.

As the angle difference between the pattern axes of the projections 21 and the figures 31 is reduced, the number of the projections 21 and the figures 31 which overlap with each other in different states is increased, leading to remarkable changeability of the pattern with the angle of observation.

The transparent sheet body 1 may have such a thickness that the relative positional relation between the projections 21 provided on the front surface 2 and the figures 31 provided on the rear surface 3 is changeable with the angle of observation, while the same is prepared from a transparent material which transmits light such as a general-purpose synthetic resin sheet of polyethylene, polypropylene, polyester, nylon, urethan or polyvinyl chloride, for example. An acrylic sheet or a soft vinyl chloride sheet is preferably employed in consideration of weather resistance or flexibility.

Figure 5:
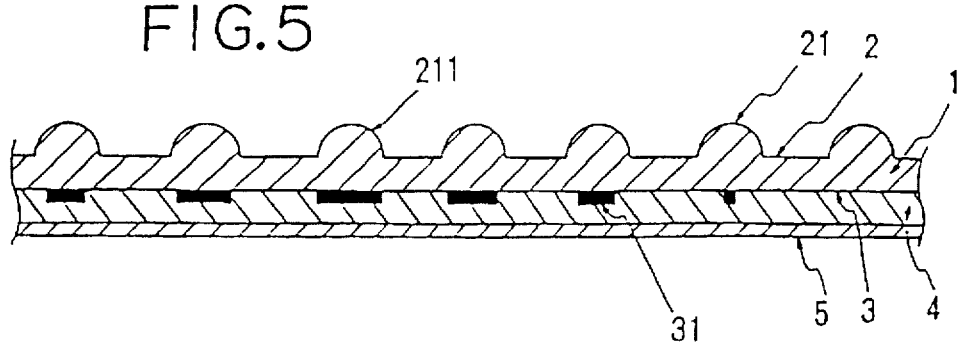
FIG. 5 is a sectional view showing a decorative sheet according to a second embodiment of the present invention.

FIG. 5 shows a decorative sheet according to a second embodiment of the present invention. In this decorative sheet, a plurality of convex lens-shaped projections 21 are provided on a front surface 2 of a transparent sheet body 1 along an arbitrary continuous pattern axis in a hexagonal pattern similarly to the decorative sheet according to the first embodiment, while dot figures 31 are printed on a rear surface 3 of the transparent sheet body 1 along a continuous pattern axis which is identical to but axially displaced from that on the front surface 2. Further, a transparent laminate sheet body 4 is stuck on the rear surface 3 of the transparent sheet body 1, and a printed layer 5 is provided on a non-stuck surface of the laminate sheet body 4.

This laminate sheet body 4 may have such a thickness that the relative positional relation between the figures 31 provided on the rear surface 3 of the transparent sheet body 1 and the printed layer 5 provided on the non-stuck surface of the laminate sheet body 4 is changeable with the angle of observation, while the same is prepared from a transparent material which transmits light such as a general-purpose synthetic resin sheet of polyethylene, polypropylene, polyester, nylon, urethan or polyvinyl chloride, for example. An acrylic sheet or a soft vinyl chloride sheet is preferably employed in consideration of weather resistance or flexibility.

The printed layer 5 is formed by a layer on which a pattern or design arranging specific characters or figures is printed.

In the decorative sheet according to the second embodiment, the dot figures 31 are visible or invisible depending on the angle of observation similarly to the decorative sheet according to the first embodiment, while the printed layer 5 provided on the non-stuck surface can be visually recognized through the laminate sheet body 4 in portions where the dot figures 31 are invisible. Due to the predetermined thickness of the laminate sheet body 4, further, the printed layer 5 overlaps with the dot figures 31 in positions which vary with the angle of observation, whereby the dot figures 31 appear to move on the printed layer 5. Namely, this decorative sheet attains excellent decorativeness, with the dot figures 31 changefully moving on the printed layer 5 depending on the angle of observation.

Figure 6:
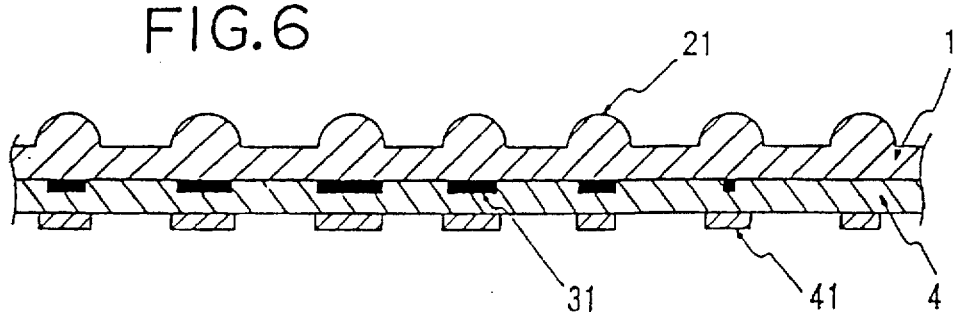
FIG. 6 is a sectional view showing a decorative sheet according to a third embodiment of the present invention.

FIG. 6 shows a decorative sheet according to a third embodiment of the present invention. In this decorative sheet, a plurality of convex lens-shaped projections 21 are provided on a front surface 2 of a transparent sheet body 1 along an arbitrary continuous pattern axis in a hexagonal pattern while dot figures 31 are printed on a rear surface 3 of the transparent sheet body 1 along a continuous pattern axis which is identical to but axially displaced from that on the front surface 2, similarly to the decorative sheet according to the first embodiment. A transparent laminate sheet body 4 is further stuck on the rear surface 3 of the transparent sheet body 1, and dot figures 41 are printed on a non-stuck surface of the laminate sheet body 4 along a continuous pattern axis which is identical to that on the front surface 2 but axially displaced from the continuous pattern axes of the front and rear surfaces 2 and 3.

When the angle of observation is continuously changed, the dot patterns 31 and 41 appear changeable with respect to the projections 21 while the relative positional relation between these dot figures 31 and 41 also appears continuously changeable due to the thickness of the transparent laminate sheet body 4 in this decorative sheet. Thus, the decorative sheet attains excellent decorativeness, with a pattern which is further complexly changeable.

Figure 7:
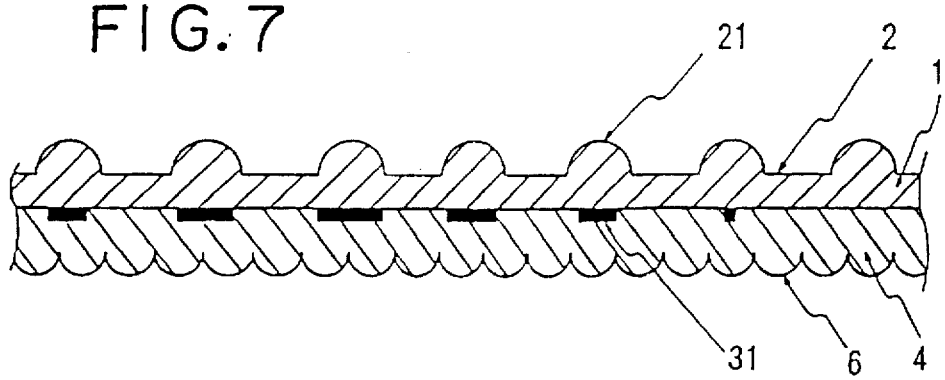
FIG. 7 is a sectional view showing a decorative sheet according to a fourth embodiment of the present invention.

FIG. 7 shows a decorative sheet according to a fourth embodiment of the present invention. In this decorative sheet, a plurality of convex lens-shaped projections 21 are provided on a front surface 2 of a transparent sheet body 1 along an arbitrary continuous pattern axis in a hexagonal pattern while dot figures 31 are printed on a rear surface 3 of the transparent sheet body 1 along a continuous pattern axis which is identical to but axially displaced from that on the front surface 2, similarly to the decorative sheet according to the first embodiment.

A transparent laminate sheet body 4 is further stuck on the rear surface 3 of the transparent sheet body 1, and an irregular pattern 6 is provided on a non-stuck surface of the laminate sheet body 4.

The irregular pattern 6 is not particularly restricted, so far as the same defines a moire pattern in combination with the projections 21 provided on the front surface 2, similarly to a lenticular lens.

In this decorative sheet, the moire pattern which is defined by the projections 21 and the irregular pattern 6 is different in image-formation position from a pattern defined by the projections 21 and the figures 31, whereby the moire pattern and the pattern defined by the figures 31 appear to be on different planes. When the angle of observation is changed, therefore, the moire pattern and the pattern defined by the figures 31 appear to changefully move on different planes, thereby providing decorativeness with a stereoscopic effect.

Figure 8:
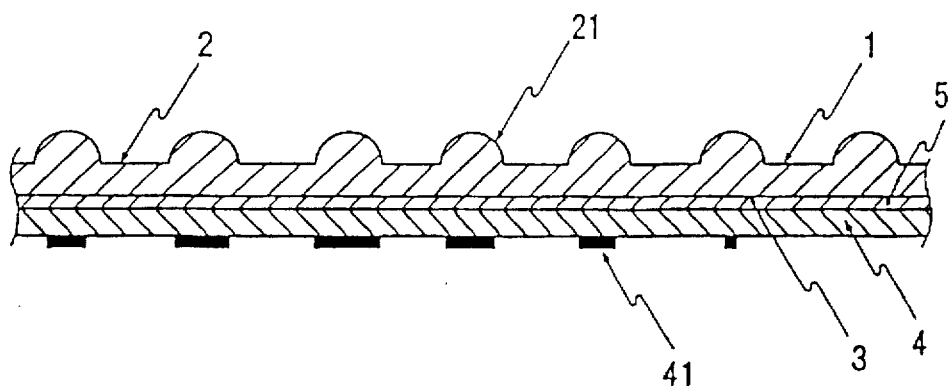
FIG. 8 is a sectional view showing a decorative sheet according to a fifth embodiment of the present invention.

FIG. 8 shows a decorative sheet according to a fifth embodiment of the present invention. In this decorative sheet, a plurality of convex lens-shaped projections 21 are provided on a front surface 2 of a transparent sheet body 1 along an arbitrary continuous pattern axis in a hexagonal pattern similarly to the decorative sheet according to the first embodiment, while a transparent printed layer 5 is provided on a rear surface 3 of the transparent sheet body 1 and a transparent laminate sheet body 4 is further stuck on the rear surface 3 of the transparent sheet body 1, so that dot figures 41 are printed on a non-stuck surface of the laminate sheet body 4 along a continuous pattern axis which is identical to but axially displaced from the continuous pattern axis on the front surface 2.

In this decorative sheet, the dot figures 41 are visible or invisible depending on the angle of observation similarly to the decorative sheet according to the first embodiment, while these dot figures 41 are seen through the transparent printed layer 5, and hence the color of the dot figures 41 is mixed with that of the transparent printed layer 5 in portions where the figures 41 are visible and the color of the transparent layer 5 is visually recognized in portions where the dot figures 41 are invisible. Further, the laminate sheet body 4 has a predetermined thickness, whereby the printed layer 5 overlaps with the dot figures 41 in positions which vary with the angle of observation, whereby the dot figures 41 appear to move on the printed layer 5. Namely, the portions of the mixed colors appear to move while changing the color of the transparent printed layer 5 with the angle of observation, thereby providing excellent decorativeness.

Examples

Example 1

An emboss roll having cavities of about 0.15 mm in diameter which were arranged in a hexagonal pattern at a pitch of 0.3 mm was employed to provide lens-shaped projections 21 on a front surface 2 of a transparent soft vinyl chloride sheet body 1 of 0.3 mm in thickness, while black dot figures 31 were arranged on a rear surface 3 in the same pattern as that of the projections 21 along a pattern axis which was different by 5° from that on the front surface 2 in a hexagonal arrangement, thereby obtaining a decorative sheet according to the present invention.

This decorative sheet was provided with continuous black hexagonal elliptic portions on the transparent sheet body 1, and transparent portions appeared to move and deform depending on the direction of observation.

Example 2

An emboss roll having cavities of about 0.15 mm in diameter which were arranged in a hexagonal pattern at a pitch of 0.33 mm was employed to provide lens-shaped projections 21 on a front surface 2 of a transparent soft vinyl chloride sheet body 1 of 0.3 mm in thickness, while white dot figures 31 were arranged on a rear surface 3 in the same pattern as that of the projections 21 along a pattern axis which was different by 5° from that on the front surface 2 in a hexagonal arrangement. A transparent soft vinyl chloride sheet body 4 of 0.2 mm in thickness was stuck on this transparent soft vinyl chloride sheet body 1 and a printed layer 5 was provided on its non-stuck surface, thereby obtaining a decorative sheet according to the present invention.

When the angle of observation was changed, the white dot figures 31 appeared to move on the printed layer 5 while becoming invisible from time to time in this decorative sheet.

Example 3

An emboss roll having cavities of about 0.15 mm in diameter which were arranged in a hexagonal pattern at a pitch of 0.33 mm was employed to provide lens-shaped projections 21 on a front surface 2 of a transparent soft vinyl chloride sheet body 1 of 0.2 mm in thickness, while yellow dot figures 31 were arranged on a rear surface 3 in the same pattern as that of the projections 21 along a pattern axis which was different by 3° from that on the front surface 2 in a hexagonal arrangement. A transparent soft vinyl chloride sheet body 4 of 0.2 mm in thickness was stuck on this transparent soft vinyl chloride sheet body 1, and green dot figures 31 were arranged on a non-stuck surface in the same pattern as that of the projections 21 along a pattern axis which was different by 10° from that of the projections 21.

When the angle of observation was changed, this decorative sheet looked as if yellow oblique figures moved on green dots.

Example 4

An emboss roll having cavities of about 0.15 mm in diameter which were arranged in a hexagonal pattern at a pitch of 0.33 mm was employed to provide lens-shaped projections 21 on a front surface 2 of a transparent soft vinyl chloride sheet body 1 of 0.4 mm in thickness, while yellow dot figures 31 were arranged on a rear surface 3 in the same pattern as that of the projections 21 along a pattern axis which was different by 3° from that on the front surface 2 in a hexagonal arrangement. A transparent soft vinyl chloride sheet body 4 of 0.2 mm in thickness was stuck on this transparent soft vinyl chloride sheet body 1, and a lenticular irregular pattern 6 was provided on a non-stuck surface at a pitch of 0.2 mm.

When the angle of observation was changed, this sheet looked as if yellow stripe figures changefully moved on a foam-like moire pattern.

Example 5

An emboss roll having cavities of about 0.15 mm in diameter which were arranged in a hexagonal pattern at a pitch of 0.33 mm was employed to provide lens-shaped projections 21 on a front surface 2 of a transparent soft vinyl chloride sheet body 1 of 0.2 mm in thickness, while a printed layer 5 was provided on a rear surface 3 by drawing predetermined figures with transparent ink. A transparent soft vinyl chloride sheet body 4 of 0.2 mm in thickness was stuck on this transparent soft vinyl chloride sheet body 1, and green dot figures 41 were printed on a non-stuck surface in the same pattern as that of the projections 21 along a pattern axis which was different by 10° from that of the projections 21.

When the angle of observation was changed, this sheet looked as if its colors were changed in portions provided with the dot figures 41.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A light-transmitting decorative sheet being formed by a transparent sheet body having front and rear surfaces, wherein a plurality of convex lens-shaped projections are provided on said front surface in an arbitrary continuous pattern and figures are provided on said rear surface in a continuous pattern being identical to that on said front surface, in displacement from said continuous pattern on said front surface.

2. The light-transmitting decorative sheet in accordance with claim 1, wherein a transparent laminate sheet body is stuck on said rear surface, with a printed layer being provided on a non-stuck surface of said laminate sheet body.

3. The light-transmitting decorative sheet in accordance with claim 1, wherein a transparent laminate sheet body is stuck on said rear surface, with figures being provided on a non-stuck surface of said laminate sheet body in a continuous pattern being identical to that on said front surface, in displacement from said continuous patterns on said front and rear surfaces of said transparent sheet body.

4. The light-transmitting decorative sheet in accordance with claim 1, wherein a transparent laminate sheet body is stuck on said rear surface, with an irregular pattern being provided on a non-stuck surface of said laminate sheet body.

5. A light-transmitting decorative sheet being formed by a transparent sheet body having front and rear surfaces, wherein a plurality of convex lens-shaped projections are provided on said front surface in an arbitrary continuous pattern, a printed layer is provided on said rear surface, and a transparent laminate sheet body is further stuck on the same so that figures are printed on a non-stuck surface of said laminate sheet body in a continuous pattern being identical to that on said front surface, in displacement from said continuous pattern being formed on said front surface of said transparent sheet body.

* * * * *